Feb. 26, 1935.   R. S. TAYLOR ET AL   1,992,514
METHOD OF MAKING AN INNER TUBE
Filed Nov. 16, 1932    2 Sheets-Sheet 1
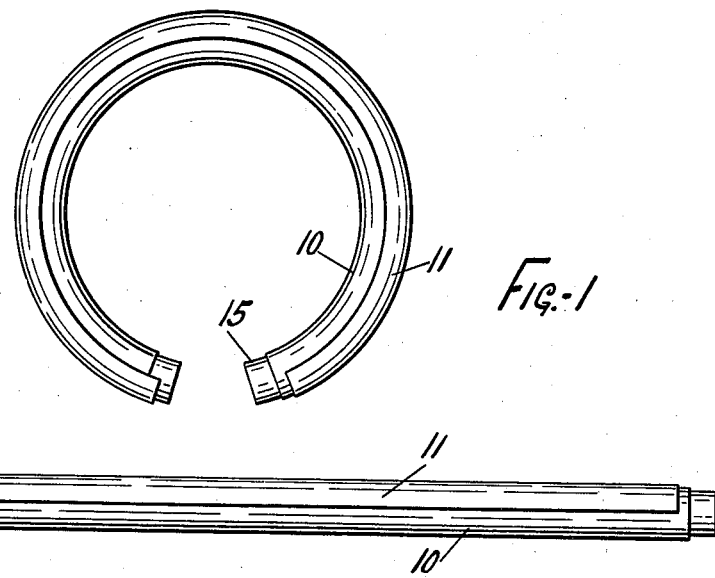
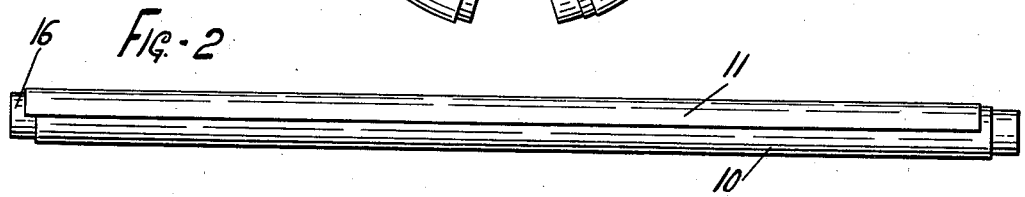
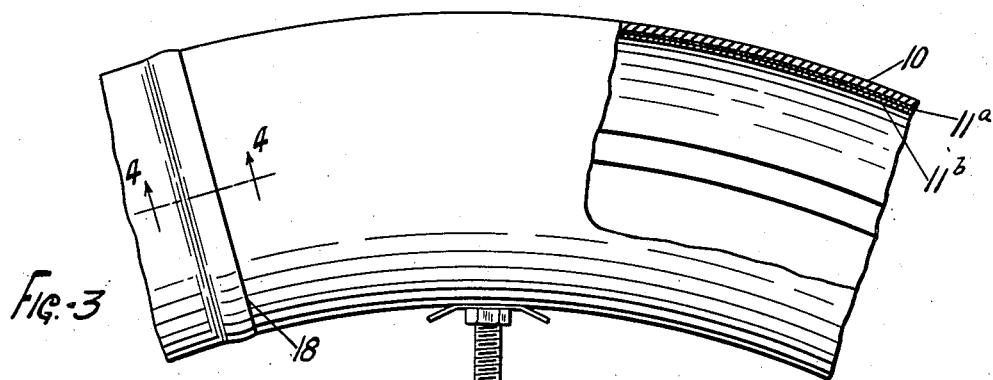
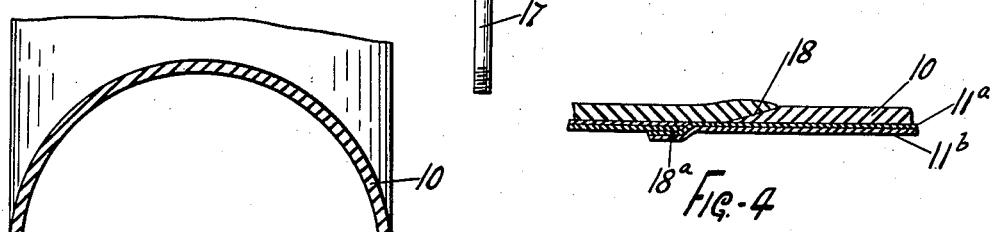
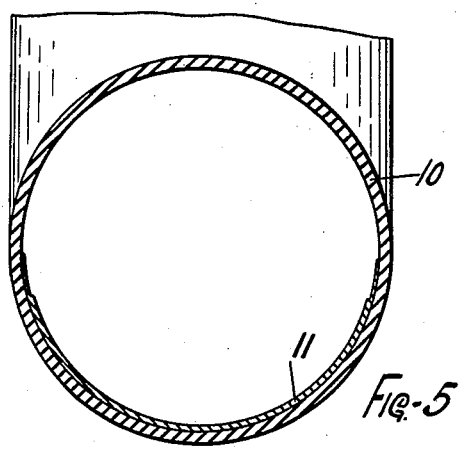
INVENTORS
RAYMOND S. TAYLOR
PHILIP M. TORRANCE
ROBERT H. ANDERSON
BY Ely & Barrow
ATTORNEYS Feb. 26, 1935.  R. S. TAYLOR ET AL  1,992,514
METHOD OF MAKING AN INNER TUBE
Filed Nov. 16, 1932    2 Sheets-Sheet 2

INVENTORS
Raymond S. Taylor
Philip M. Torrance
Robert H. Anderson
BY Ely & Barrow
ATTORNEYS Patented Feb. 26, 1935

1,992,514

UNITED STATES PATENT OFFICE 1,992,514

METHOD OF MAKING AN INNER TUBE

Raymond S. Taylor, Philip M. Torrance, and Robert H. Anderson, Akron, Ohio, assignors to The Firestone Tire & Rubber Company, Akron, Ohio, a corporation of Ohio Application November 16, 1932, Serial No. 642,834

10 Claims. (Cl. 154—15)

This invention relates to inner tubes and to methods of making the same, and more especially it relates to puncture-proof inner tubes for pneumatic tires or other inflatable bodies, and to procedure for manufacturing such tubes.

The improved inner tube is of the type that comprises puncture-sealing composition in its structure as distinguished from the compression type of puncture-closing tube, and the chief objects of the invention are to provide a puncture-proof inner tube having improved puncture-sealing composition incorporated in its structure; to reduce the weight of tubes of the character mentioned; to provide improved puncture-sealing properties in the tube; and to provide an improved method of making the tube that will result in economy and facility of manufacture, and reduce the cost of the tube.

A salient feature of the inner tube of the invention is the elimination of the inner layer of vulcanized rubber or other material covering the plastic puncture-sealing compound. An important advantage of the novel method devised is the utilization of a sealing layer which is not excessively tacky or plastic during the manufacturing and assembling stages, but which acquires these characteristics upon being subjected to heat at vulcanizing temperatures, as contrasted with the prior art methods in which the puncture-sealing layer is very tacky during the entire manufacturing process.

Of the accompanying drawings:

Figure 1 shows the improved inner tube in the initial stage of manufacture, mounted upon a curved mandrel;

Figure 2 is a view showing the inner tube, in the initial stage of manufacture, mounted upon a straight mandrel which may be used in lieu of the curved mandrel shown in Figure 1;

Figure 3 is a fragmentary side elevation of the fabricated inner tube as it appears when ready to be vulcanized, a part thereof being broken away and in section;

Figure 4 is a section on the line 4—4 of Figure 3;

Figure 5 is a fragmentary transverse section through a completed inner tube;

Figure 8 is a fragmentary detail section of the tread of a pneumatic tire having the improved inner tube therein, showing the action of the tube constituents when pierced by a nail or the like.

Figure 8:
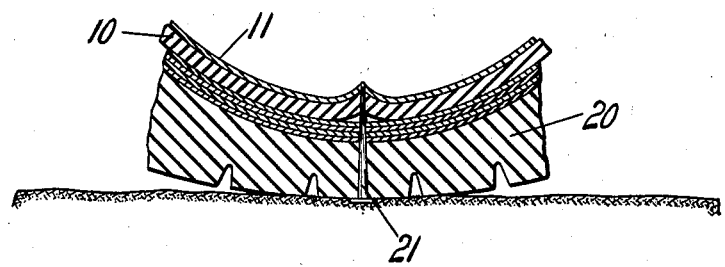

Referring to the drawings, particularly Figure 5 thereof, it will be seen that the improved inner tube comprises an annular, tubular structure 10 of the usual elastic vulcanized rubber composition, and a layer 11 of sticky, unvulcanized plastic rubber composition on the inside of the tube so disposed as to cover substantially the outer peripheral half of the tube.

The sticky layer 11 is composed of rubber composition that has been softened and made plastic by a chemical agent in the presence of heat during the vulcanizing of the tube proper. Before being heated the composition has the same physical characteristics as ordinary unvulcanized rubber composition, being semi-plastic and only slightly tacky, and easily worked. Thus it is a simple matter to incorporate the layer 11 in the tube structure during the fabrication thereof.

The following formula for the layer 11 has been found to give satisfactory results.

| | Percent |
|---|---|
| Phosphoric acid | 2 |
| Clay | 1¾ |
| Rosin oil | 3 |
| Rubber | 93¼ |

The particular softening chemical agent used is ortho phosphoric acid ($H_3PO_4$) of 85% strength. The clay serves as a vehicle for the phosphoric acid, the clay and acid being mixed together before being added to the other ingredients.

The rosin oil serves as a softener and tack producer, and its use here is typical of many rubber compounds. The several ingredients are mixed on a rubber mill in the usual manner, the mixture having the physical characteristics of normal compounded rubber stock. It may be calendered into sheets and slit into strips for use in building inner tubes.

In the manufacture of the improved composite inner tube, the body structure 10 may be made from a continuous tube of extruded, vulcanizable rubber composition that is cut to length and mounted upon a curved mandrel 15, as shown in Figure 1, or, the said body structure may be built up in laminated form, upon a straight mandrel 16 as shown in Figure 2. The layer 11 is then applied to the body structure 10, longitudinally thereof, over about half the transverse circumference of said body structure, one end portion of the layer projecting beyond the end of the body structure, while the other end portion of the layer terminates short of the end of the body structure. In the structure shown in Figure 1 the layer 11 covers the outer peripheral half of the body structure, which portion eventually is the tread portion of the tube. Preferably the layer 11 consists of two plies of the non-vulcanizing stock, as is shown at 11a, 11b, Figures 3 and 4. A non-tacky plastic layer may then be formed on the tube as by coating with a thin film of lacquer, paint, varnish, sulphur chloride, plasticized gelatin or glue, cotton flock or vulcanizable rubber cement. When the tube is turned inside out, this layer will prevent the walls from adhering to each other during the finishing processes and during the packing, shipping and use of the tube.

After the tube has been constructed as described, it is removed from its mandrel, in which operation it is turned inside out so that the layer 11 is disposed interiorly thereof. A valve stem 17 is then mounted in the tube, and the interior of the tube is treated sparingly with a suitable lubricant such as powdered soapstone, and the respective end portions of the tube are complementally beveled or skived, after which said end portions are brought together in a lapped splice 18, as shown in Figure 4, the projecting end of layer 11 forming an offset splice 18a. The tube is then mounted in a mold and subjected to heat and internal pressure in the usual manner to vulcanize.

Figure 6:
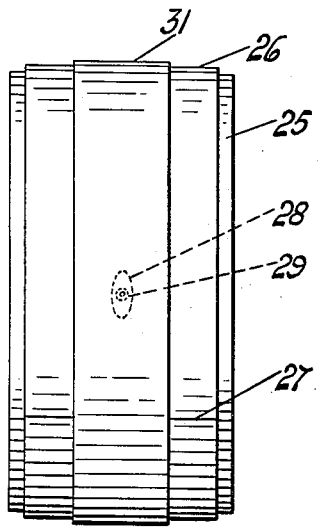
Figure 6 shows the improved inner tube in the initial stage of manufacture on a drum which may be used in lieu of the mandrels shown in Figures 1 and 2.
Figure 7:
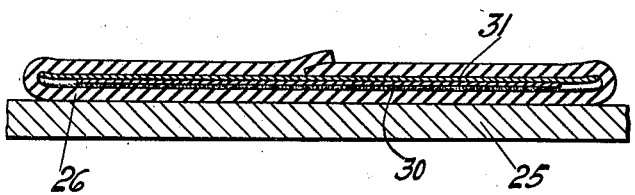
Figure 7 is an enlarged section of the tube of Figure 6 in a subsequent stage of manufacture.

The tube may also be built upon a drum 25 in annular form as illustrated in Figures 6 and 7. By this method the band 26 of extruded or calendered rubber composition is applied about the drum and the ends joined in a transverse splice 27. The valve patch 28 and valve stem 29 are then mounted in the usual manner. A coating 30 of powdered soapstone is applied centrally and circumferentially upon band 26, and the stepped-down, two-ply layer 31 of non-vulcanizable rubber is mounted thereon so as not to adhere to the band 26. The marginal portions of band 26 and the outer surface of layer 31 may then be softened with gasoline or other suitable rubber solvent, after which the marginal portions of the band are folded over and adhered to the layer 31 and joined to each other in a lapped circumferential splice as shown in Figure 7. The tube may then be removed from the drum and vulcanized in a mold in the usual manner.

The application of heat to the tube results in the vulcanization of the body structure 10, but the layer 11, due to the presence of the chemical agent and absence of sulphur, accelerator or other vulcanizing ingredients in its composition, does not vulcanize. On the contrary the layer 11 becomes extremely plastic, almost viscous in form, and interiorly is very sticky. Although the non-tacky layer in the tube causes the surface of layer 11 to be somewhat less sticky so that it will not adhere to the opposite wall of the tube should it come in contact therewith, it is preferable that the finished tube be kept in lightly inflated condition.

Figure 9:
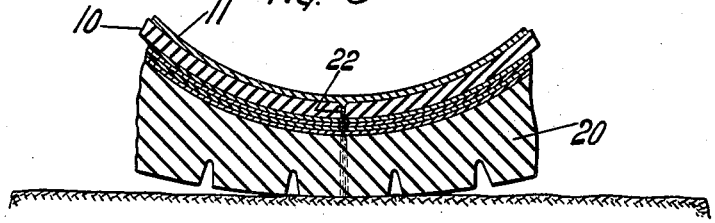
Figure 9 is a view similar to Figure 8 showing the action of the tube as the nail is withdrawn.

The action of the tube in service is illustrated in Figures 8 and 9 wherein 20 designates the tread portion of a pneumatic tire casing within which the tube is mounted, and 21 designates a nail or tack that has penetrated the tire tread and tube, thus passing through the sticky layer 11 of the latter. The sticky stock 11 adheres to nail 21 so that when the nail is withdrawn it draws some of the stock 11 with it so as completely to seal the hole through the body structure 10, as shown at 22, Figure 9, and thus effectively to prevent the escape of air from the inner tube. This sealing action is greatly superior to that of a puncture-sealing inner tube in which an internal layer of vulcanized rubber covers the plastic layer. In the latter instance the vulcanized rubber has a restraining action on the plastic layer which prevents the latter from following the nail and filling the hole as the nail is withdrawn. The thin film of relatively non-tacky material coated on the interior of the tube as described above, does not interfere with the effective sealing qualities.

The layer 11 retains its sticky character for an indefinite period and provides a positive seal against puncture of the tube. The tube is less costly, lighter in weight, and provides easier riding than puncture-sealing tubes of the compression type. The tube may be manufactured with but slight departure from the usual tube-manufacturing methods, and the invention achieves the other advantages set out in the foregoing statement of objects.

In addition to ortho-phosphoric acid it has been found that many other chemical agents also have the power to cause the rubber to become permanently tacky and plastic upon being subjected to heat at vulcanizing temperatures and may therefore be used in compounding layer 11. The following is a representative list of these agents:

Sulphuric acid
Chromic acid
Phosphorus pentoxide
Phthalic anhydride
Potassium permanganate
Meta-phosphoric acid
Phosphorous acid
Boric acid
Lead peroxide
Di-sodium phosphate
Stannous chloride
Furoic acid
Para toluene sulphonic acid
Chloro sulphonic acid
Mono-sodium phosphate
Arsenic acid
Copper sulphate Other modifications may be resorted to without departing from the spirit of the invention or the scope of the appended claims, which are not limited wholly to the specific construction shown or exact procedure described.

What is claimed is:

1. The method of making inner tubes which comprises constructing a tube of two different plastic rubber compositions, and then subjecting the tube to heat to concurrently vulcanize one of said plastic compositions and increase the plasticity of the other composition.

2. The method of making inner tubes which comprises constructing a tube of two different layers of plastic rubber composition, the outer one of which is vulcanizable and the inner of which becomes more plastic in the presence of heat, and then heating the tube to vulcanize the outer layer and to increase the plasticity of the inner layer.

3. The method of making inner tubes which comprises constructing a tube of two different plastic rubber compositions, one of which is vulcanizable and the other of which includes a vulcanization retarder, and subjecting the tube to heat to vulcanize one of said compositions and to increase the plasticity of the other composition.

4. The method of making inner tubes which comprises constructing a tube of two different plastic rubber compositions, and then vulcanizing one of said compositions while heating the other in the presence of phosphoric acid.

5. The method of making inner tubes which comprises constructing an annular, tubular outer structure of plastic rubber composition and a local, internal, circumferential layer of plastic rubber composition, and then vulcanizing the tubular structure while subjecting the internal layer to heat in the presence of a material to increase the plasticity thereof.

6. The method of making inner tubes which comprises constructing a tube of two different plastic rubber compositions, applying a coating of non-tacky plastic material to the interior of said tube to prevent the internal walls of the finished tube from sticking together, and then vulcanizing one of said compositions while heating the other to render it permanently plastic and tacky.

7. The method of making inner tubes which comprises constructing an annular, tubular outer structure of rubber composition including a vulcanizing agent, laminating on the interior thereof a puncture-sealing layer of rubber composition including a reagent which causes the rubber composition to become permanently plastic upon being subjected to heat, and then vulcanizing the tubular structure while subjecting the puncture-healing layer to heat.

8. The method of making inner tubes which comprises constructing an annular, tubular outer structure of rubber composition including a vulcanizing agent, laminating on the interior thereof a puncture-sealing layer of rubber composition including a reagent which causes the rubber composition to become permanently plastic upon being subjected to heat, leaving the internal surface of said layer exposed to the interior of said tube, and then vulcanizing the tubular structure while subjecting the puncture-healing layer to heat.

9. The method of making inner tubes which comprises constructing an annular, tubular outer structure of rubber composition including a vulcanizing agent, laminating on the interior thereof a puncture-sealing layer of rubber composition including a reagent which causes the rubber composition to become permanently plastic upon being subjected to heat, coating the interior of said tube and layer assembly with a material to prevent the internal walls of the finished tube from sticking together, and then vulcanizing the tubular structure while subjecting the puncture-healing layer to heat.

10. The method of making puncture-sealing inner tubes which comprises applying a band of vulcanizable rubber composition about a drum, applying a coating of non-adhesive material about the central portion of said band, applying a strip of plastic puncture-sealing rubber composition about said central portions of said band, folding the marginal portions of said band around said strip, attaching the lateral edges of said marginal portions to form a circumferential splice, and stitching the peripherally outer portions of said band to said strip whereby said strip will be adhesively secured to the interior of the outer peripheral portion of the tube thus formed, and vulcanizing said tube.

RAYMOND S. TAYLOR.
PHILIP M. TORRANCE.
ROBERT H. ANDERSON.